US011737028B2

(12) United States Patent
Ikari (10) Patent No.: US 11,737,028 B2
(45) Date of Patent: Aug. 22, 2023

(54) METHOD AND SYSTEM FOR CONTROLLING COMMUNICATION MEANS FOR DETERMINING AUTHENTICATION AREA TO REDUCE BATTERY CONSUMPTION OF MOBILE DEVICES

(71) Applicant: Konica Minolta Business Solutions U.S.A., Inc., Ramsey, NJ (US)

(72) Inventor: Hiroki Ikari, Foster City, CA (US)

(73) Assignee: KONICA MINOLTA BUSINESS SOLUTIONS U.S.A., INC., Ramsey, NJ (US)

( * ) Notice: Subject to any disclaimer, the term of this patent is extended or adjusted under 35 U.S.C. 154(b) by 95 days.

(21) Appl. No.: 17/363,153

(22) Filed: Jun. 30, 2021

(65) Prior Publication Data

US 2023/0007592 A1 Jan. 5, 2023

(51) Int. Cl.
*H04W 52/02* (2009.01)
*H04W 52/28* (2009.01)
*H04W 12/63* (2021.01)
*H04W 12/065* (2021.01)
*H04W 4/02* (2018.01)

(52) U.S. Cl.
CPC ..... *H04W 52/0264* (2013.01); *H04W 12/065* (2021.01); *H04W 12/63* (2021.01); *H04W 52/283* (2013.01); *H04W 4/02* (2013.01)

(58) Field of Classification Search
CPC ....... H04W 4/00–029; H04W 4/30–38; H04W 4/80; H04W 80/00–06
See application file for complete search history.

(56) References Cited

U.S. PATENT DOCUMENTS

| | | | | |
|---|---|---|---|---|
| 2011/0300875 A1* | 12/2011 | Kim | .................. | G01S 19/47 455/456.1 |
| 2013/0059609 A1* | 3/2013 | Raento | .................. | H04W 4/02 455/456.6 |
| 2013/0102268 A1* | 4/2013 | Wang | .................. | H04M 1/72457 455/343.2 |
| 2013/0178205 A1* | 7/2013 | Singhal | .................. | H04W 52/0251 455/435.1 |
| 2014/0031011 A1* | 1/2014 | West | .................. | G06F 21/6272 455/411 |

(Continued)

FOREIGN PATENT DOCUMENTS

JP 2018107653 A 7/2018

*Primary Examiner* — San Htun
(74) *Attorney, Agent, or Firm* — Buchanan Ingersoll & Rooney PC (57) ABSTRACT

A method, a non-transitory computer readable medium, and a mobile device are disclosed for reducing battery consumption of mobiles devices with location settings. The method includes: enabling a location setting on the mobile device, the location setting having an on state and an off state, the on state being a state in which location services are available to applications on the mobile device and the off state being a state in which location services are not available to applications on the mobile device; checking a battery life of the mobile device; and when the battery life of the mobile device is less than or equal to a preset threshold: changing a status of the location setting on the mobile device to the off state when the mobile device is not running an application that is using the location services; or maintaining the location setting in the on state.

20 Claims, 9 Drawing Sheets

(56) References Cited

U.S. PATENT DOCUMENTS

2015/0024701 A1\* 1/2015 Nagashima ....... H04W 52/0254
 455/404.1
2016/0073351 A1\* 3/2016 Cardozo ........... H04W 52/0258
 455/574

\* cited by examiner

METHOD AND SYSTEM FOR CONTROLLING COMMUNICATION MEANS FOR DETERMINING AUTHENTICATION AREA TO REDUCE BATTERY CONSUMPTION OF MOBILE DEVICES

FIELD

The present disclosure generally relates to a method and system for controlling communication means for determining authentication area to reduce battery consumption of mobile devices, and more particularly, and a method and system for reducing battery consumption of mobiles devices with location settings.

BACKGROUND

Mobile devices such as smartphones can be used as an authentication device is known. For example, authentication applications are known that can unlock a door using a mobile device. The authentication application can be installed on the mobile device in advance and can store the authentication data that replaces, for example, the uses of a physical card for access to a building, car, and the like. Using communication technology such as near-field communication (NFC) installed in the mobile device, by holding the mobile device over an authenticator installed next to the door, the authentication flow using the authentication data is started, and when the authentication is successful. The technology can be used to unlock the door, which replaces the flow realized by physical cards with mobile devices. In addition, as a technology that further develops this, it is also known to use communication technology such as Bluetooth installed in mobile devices to communicate with an authenticator or reader even from a remote position and unlock the door. However, in order to realize these, it is necessary to enable the NFC, Bluetooth, and GPS functions installed in the mobile device in advance.

Even when the door is not unlocked, it is necessary to enable NFC, Bluetooth, and GPS functions, etc. As a result, since the above functions operate in the background, power consumption during that period is required, and there is a risk of consuming the battery of the mobile device more than necessary. For such risks, workarounds such as enabling these functions only when the user wants to unlock the door and disabling these functions at other times can be considered, which can affect the user's convenience,

SUMMARY

In consideration of the above issues, it would be desirable to have a method and system that keeps the convenience of unlocking the door while reducing battery consumption when NFC, Bluetooth, and GPS functions are enabled in a mobile device such that by automatically changing the state of the location services, for example, the GPS function on a mobile device, communication with an authenticator that permits access to an authenticated mobile device. In addition, it would be desirable that a system and method that can be implemented while suppressing battery consumption due to standby power of each function of the mobile device and without impairing the convenience of the user to access buildings and the like.

In accordance with an aspect, a method is disclosed for reducing battery consumption of mobiles devices with location settings, the method comprising: enabling a location setting on the mobile device, the location setting having an on state and an off state, the on state being a state in which location services are available to applications on the mobile device and the off state being a state in which location services are not available to applications on the mobile device; checking a battery life of the mobile device; and when the battery life of the mobile device is less than or equal to a preset threshold: changing a status of the location setting on the mobile device to the off state from the on state when the mobile device is not running an application that is using the location services; or maintaining the location setting in the on state when one or more applications are using the location services.

In accordance with another aspect, a non-transitory computer readable medium storing computer readable program code executed by a processor for reducing battery consumption of mobiles devices with location settings, the process comprising: enabling a location setting on the mobile device, the location setting having an on state and an off state, the on state being a state in which location services are available to applications on the mobile device and the off state being a state in which location services are not available to applications on the mobile device; checking a battery life of the mobile device; and when the battery life of the mobile device is less than or equal to a preset threshold: changing a status of the location setting on the mobile device to the off state from the on state when the mobile device is not running an application that is using the location services; or maintaining the location setting in the on state when one or more applications are using the location services.

In accordance with an aspect, a mobile device having a battery consumption application is disclosed, the mobile device comprising: a memory; and a processor configured to: enable a location setting on the mobile device, the location setting having an on state and an off state, the on state being a state in which location services are available to applications on the mobile device and the off state being a state in which location services are not available to applications on the mobile device; check a battery life of the mobile device; and when the battery life of the mobile device is less than or equal to a preset threshold: change a status of the location setting on the mobile device to the off state from the on state when the mobile device is not running an application that is using the location services; or maintain the location setting in the on state when one or more applications are using the location services.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 1:
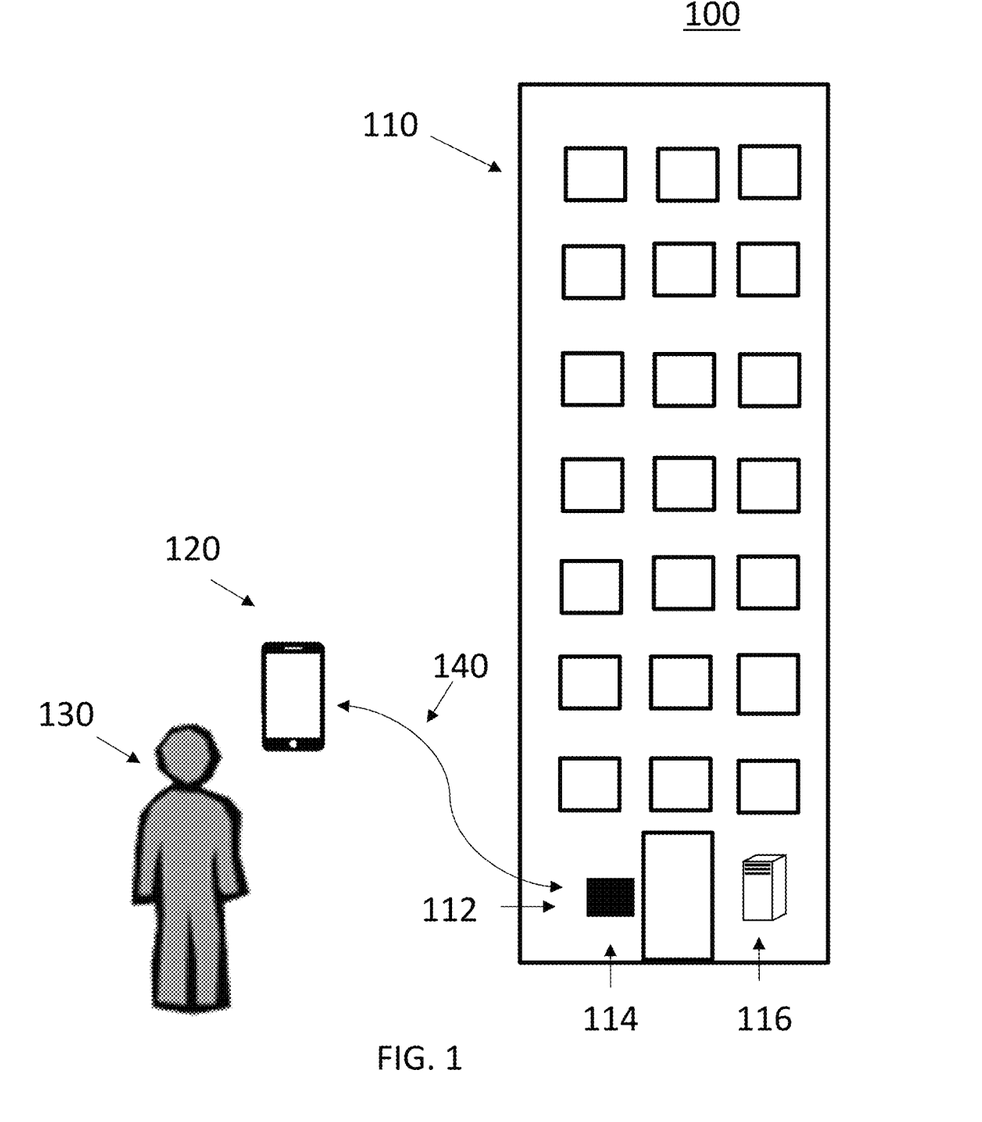
FIG. 1 is an illustration of an environment for a method and system for controlling communication means for determining authentication area to reduce battery consumption of mobile devices in accordance with an exemplary embodiment.

FIG. 1 is an illustration of an environment for a method and system for controlling communication means for determining authentication area to reduce battery consumption of mobile devices in accordance with an exemplary embodiment. As shown in FIG. 1, a user 130 may wish to access a building 110 via, for example, an authenticator 112 via an authentication application hosted on a mobile device 120 of the user 130. The authenticator can be, for example, an access door control system, which includes a reader 114, which can be a standalone system or the reader 114 can be in communication with an authentication server 116, which can receive the authentication credentials to provide access. The authentication application, for example, allows the user 130 to access (i.e., unlocks a door) the building 110 by bringing his mobile device 120 into contact with the authenticator 112 or within a define range or distance to the authenticator 112. In accordance with an exemplary embodiment, the defined range can be based on the type of means of communication between the mobile device 120 and the authenticator 112. For example, the mobile device 120 can be equipped with a global position satellite (GPS) module which can act as a means of identifying an authentication area and Bluetooth or NFC or both can be used as a means of communication for authentication. For example, in accordance with an exemplary embodiment, the GPS module can be used to trigger the on/off settings of the authentication communication to automatically switch the authentication application into an on state from an off state. In addition to buildings 110, the method and system as disclosed herein can be applicable to homes, offices, cars, storage lockers and about anything with a door that can be locked and unlocked.

Figure 2:
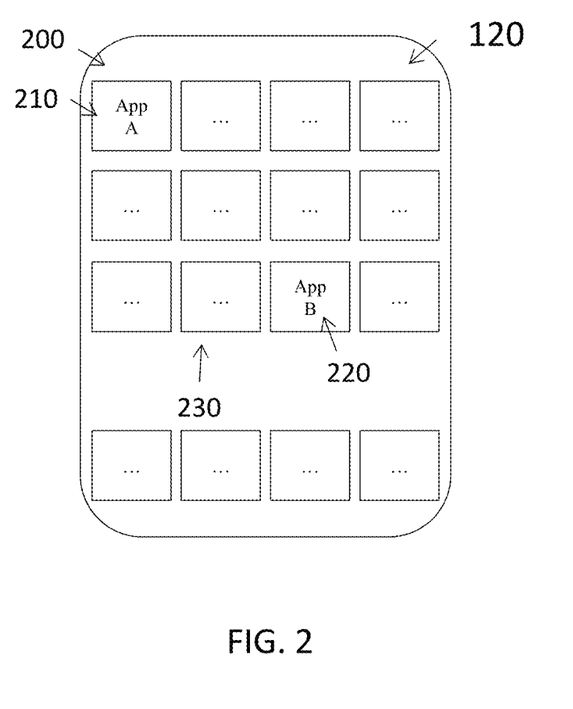
FIG. 2 is an illustration of a display unit or user interface of a mobile device having an authentication application in accordance with an exemplary embodiment.

FIG. 2 is an illustration of a display unit or user interface (also known as a graphical user interface (GUI) 200 of a mobile device 120 in accordance with an exemplary embodiment. As shown in FIG. 2, the display unit or user interface 200 can be a touch screen (or touch pad) 230 having a plurality of icons 210, 220 for frequently used applications, for example, a telephone module, an e-mail client module, a browser module, a video and music player module, a messages module, a calendar, a camera module, maps, weather, and application or module, which provides access to settings for mobile device 120 and various applications. In accordance with an exemplary embodiment, the display unit or user interface 200 also includes, for example, an icon 210 ("App A") for an authentication application for access to a building, a car, and the like as disclosed herein, and icon 220 ("App B") for a battery consumption application as disclosed herein. The battery consumption application 220 can include a functionality that can activate or enable a location service, for example, a global positioning satellite (GPS) service and to change a state of the location service from a first state (i.e., an on state) to a second state (i.e., an off state) and from the second state to the first state as disclosed herein. In addition, the mobile device 120 can include a functionality that one or more of location services, for example, GPS, and communication protocols, for example, Bluetooth®, NFC, ZigBee® and other communication means can be activated or deactivated (i.e., enabled and disabled). In accordance with an exemplary embodiment, the authentication application 210 and the battery consumption application 220 can be combined into a single application on the mobile device 120 rather than two separate applications.

Figure 3:
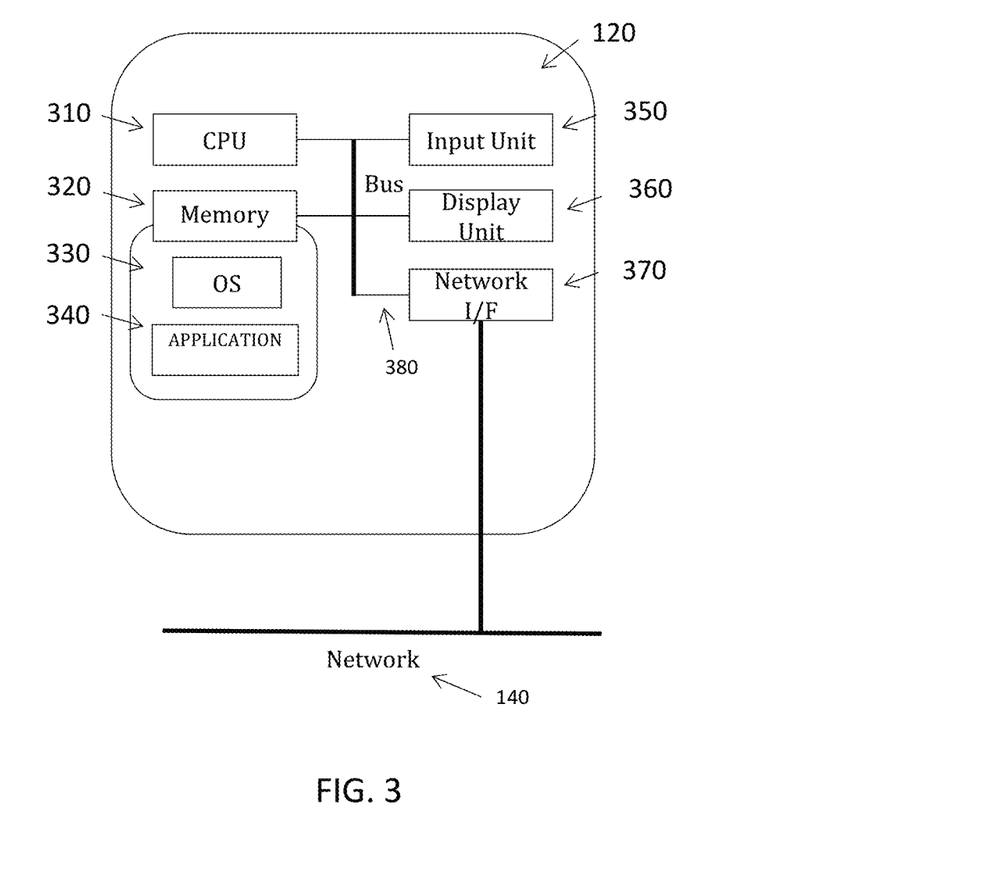
FIG. 3 is an illustration of a mobile device having an authentication application in accordance with an exemplary embodiment.

FIG. 3 is an illustration of a mobile device 120 in accordance with an exemplary embodiment. As shown in FIG. 3, the mobile device 120 can include a processor or central processing unit (CPU) 310, and one or more memories 320 for storing software programs and data, an operating system 330, and applications 340. In accordance with an exemplary embodiment, the applications 340 can include, for example, an authentication application 210 and a battery consumption application 220. The processor or CPU 310 carries out the instructions of a computer program, which operates and/or controls at least a portion of the functionality of the mobile device 120. The mobile device 120 can also include an input unit 350, a display unit or graphical user interface (GUI) 360, and a network interface (I/F) 370, which is connected to a communication network (or network) 140, and a battery 380. The battery 380 can be a rechargeable battery, for example, a lithium-ion (or li-ion) battery. The battery 380 is able to hold a charge, however, as the mobile device 120 is used, the life of the battery 380 is reduced, such that in the absence of charging the battery 380, the battery 380 can be depleted and the mobile device 120 will no longer work. A bus 390 can connect the various components 310, 320, 330, 340, 350, 360, 370, 380 within the mobile device 120. In accordance with an exemplary embodiment, the communication network 140 can includes wireless or short-range wireless communication protocols such as Bluetooth, near-field communication (NFC), or ZigBee.

In accordance with an exemplary embodiment, the mobile device 120 can include a display unit or graphical user interface (GUI) 360, which can access, for example, a web browser (not shown) in the memory 320 of the mobile device 120. The mobile device 120 also includes the operating system (OS) 330, which manages the computer hardware and provides common services for efficient execution of various software programs. In accordance with an exemplary embodiment, the OS 330 of the mobile device 120 is a Linux or Windows® based operating system.

In accordance with an exemplary embodiment, the mobile device 120 can also preferably include an authentication module, which authenticates a user, for example, by fingerprint recognition or authentication, or other authentication protocol, which are currently implemented or will be implemented on mobile devices. For example, a password authentication protocol, which uses credentials, such as username and password can be used.

Figure 4:
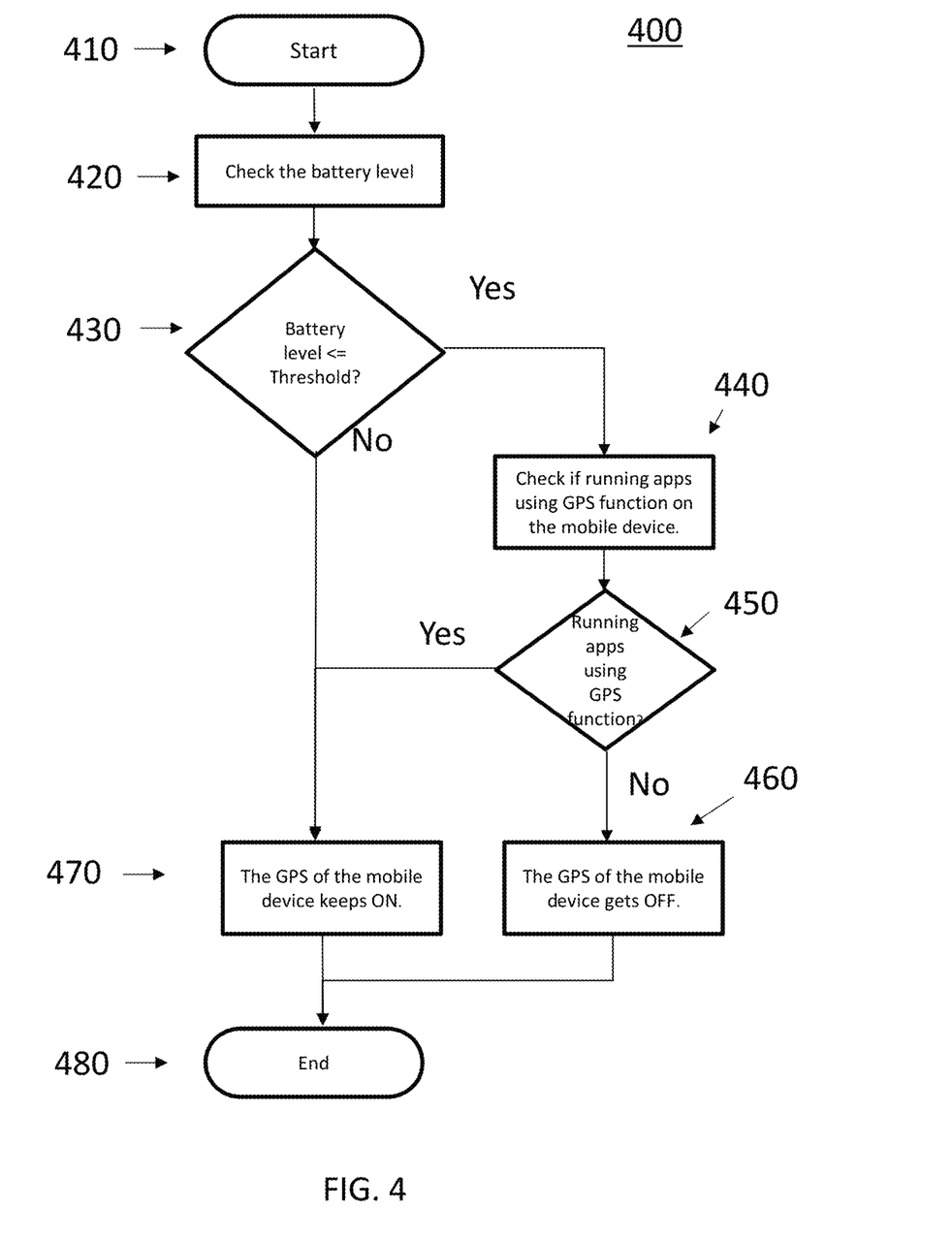
FIG. 4 is a flow chart illustrating an embodiment of a method and system for controlling communication means for determining authentication area to reduce battery consumption of mobile devices.

FIG. 4 is a flow chart 400 illustrating an embodiment of a method and system for controlling communication means for determining an authentication area to reduce battery consumption of mobile devices. As shown in FIG. 4, the process starts at step 410 in which a location setting, for example, a global positioning position (GPS) function on the mobile device 120 is enabled, i.e., placed in a state of on in which locations services can be detected by the mobile device 120. In the enabled or the on state, a receiver of the GPS function on the mobile device calculates a position and time based on data received from multiple GPS satellites. Each satellite carries an accurate record of its position and time, and transmits that data to the receiver. In the exemplary embodiment, the location service on the mobile device is preferably GPS. However, the location service can be any location service, for example, control plane locating of the mobile device 120, IoT and blockchain-based relative object location verification, or technologies in which a location of a mobile device can be determined.

In step 420, the application 340 can be configured to check if the battery level of the mobile device 120 has fallen below a preset threshold. For example, the preset threshold can be set to be 10% to 90% of the remaining battery life of the mobile device 120. For example, the preset threshold can be 10%, 20%, 30%, 40%, 50%, 60%, 70%, 80%, or 90% of the remaining battery life of the mobile device 120.

In step 430, if the battery life remaining on the mobile device 120 has fallen below the preset threshold, the process continues to step 440 where the application 340 is configured to determine if the application 340 is using the GPS function on the mobile device 120. In step 450, if the mobile device 120 is running the GPS function, the process continues to step 460 where the GPS function on the mobile device 120 is turned off. Alternatively, in step 450, if the mobile device 120 is running the GPS function, the process continues to step 470 in which the GPS function of the mobile device 120 remains in the state of on. In addition, if the battery level is not less than or equal to the preset threshold measured in step 420, and process continues to step 470 where the GPS function on the mobile device 120 remains in the state of on so that the user can use his mobile device 120 as an authentication device. In accordance with an exemplary embodiment, the process can return, for example, to step 410, at a predefined intervals. For example, the predefined intervals can be set by the user 130 via the application 340, for example, to 1 minute to an hour, for example, preferably 5 minutes to 15 minutes, in which the process as disclosed in FIG. 4 is repeated. The process ends in step 480.

Figure 5A:
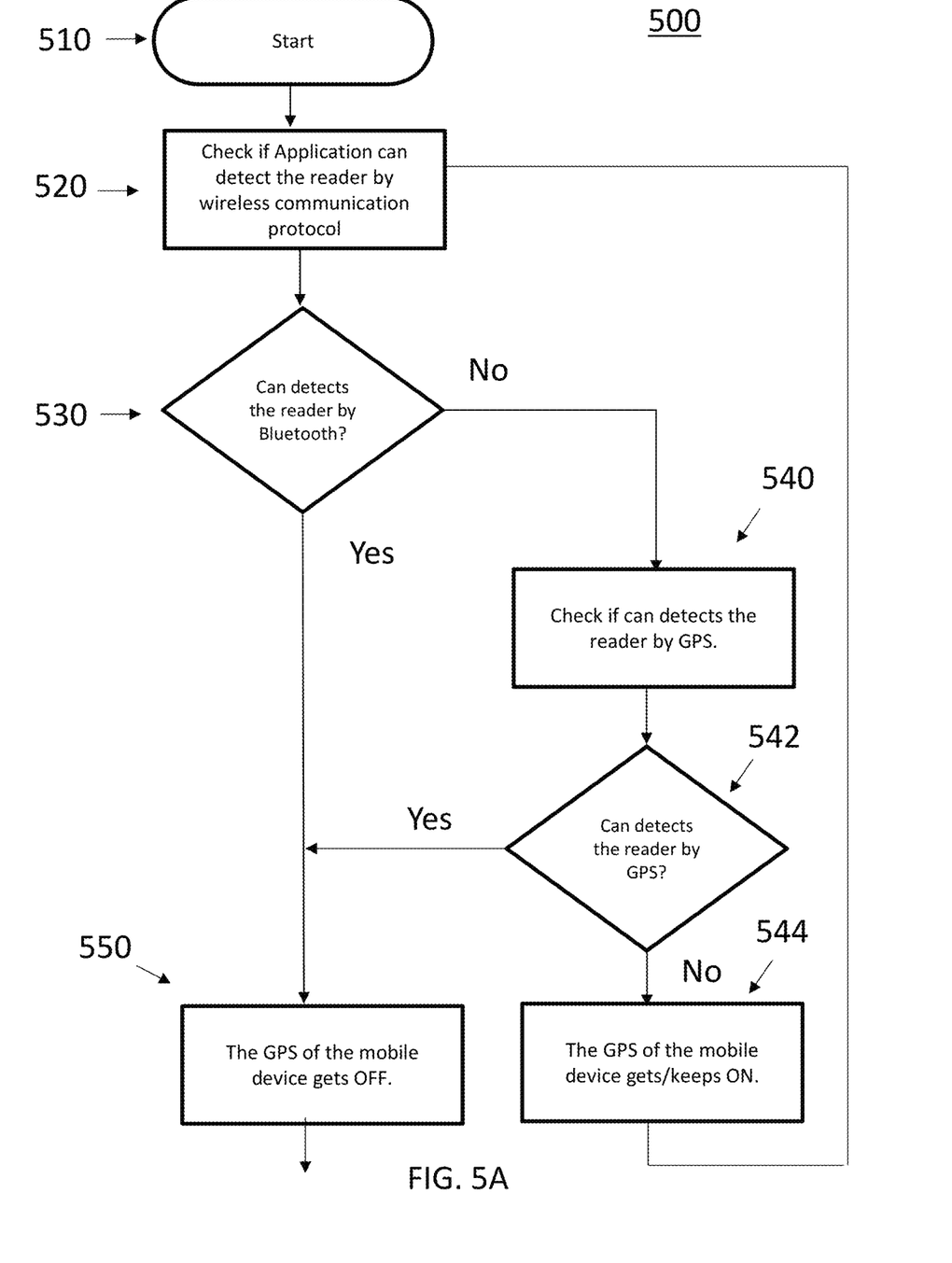
FIGS. 5A and 5B are flow charts illustrating another embodiment of a method and system for controlling communication means for determining authentication area to reduce battery consumption of mobile devices.
Figure 5B:
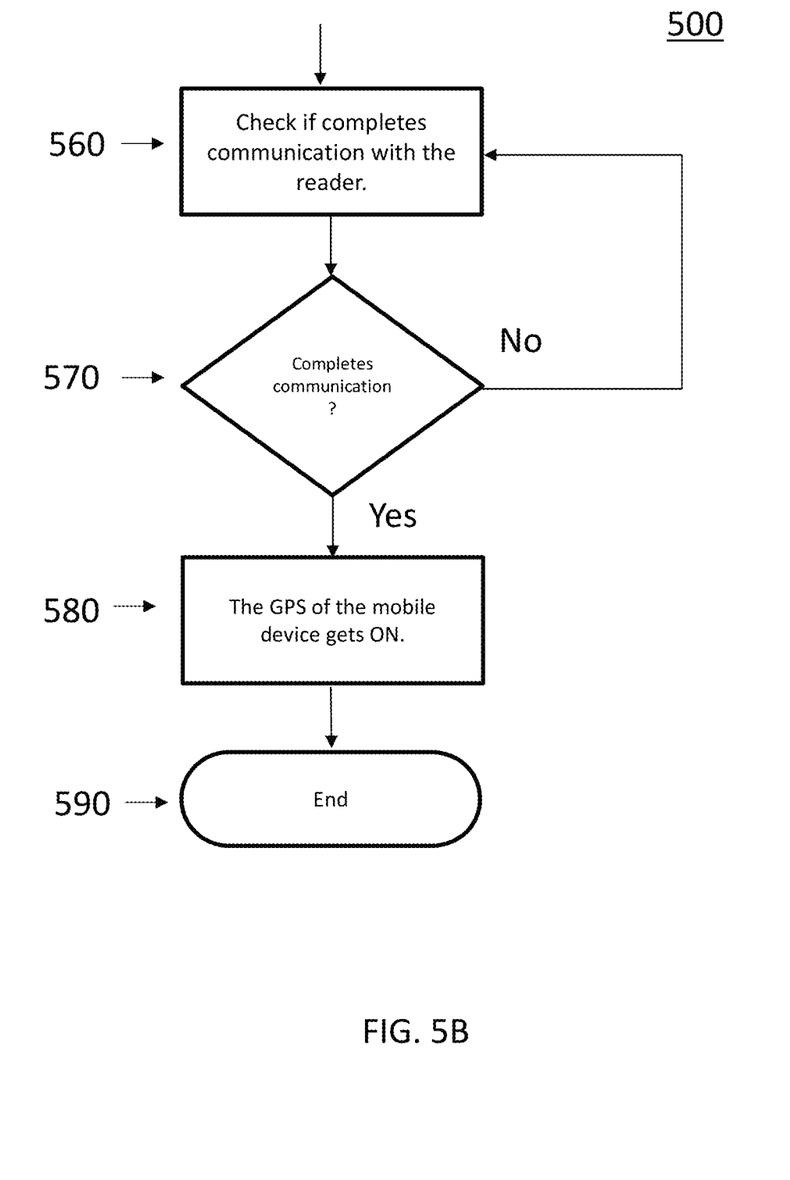

FIGS. 5A and 5B are flow charts 500 illustrating another embodiment of a method and system for controlling communication means for determining authentication area to reduce battery consumption of mobile devices. As shown in FIG. 5A, the process starts in step 510 in which the location setting is enabled (i.e., in an on state), and the Tireless communication protocol is also enabled (i.e., in an on state). In step 520, the application 340 on the mobile device 120 determines if the authenticator 112, for example, on the building 110, can be detected by, for example, by a communication protocol such as Bluetooth®, The communication protocol can be a wireless protocol or short-range wireless protocol such as Bluetooth, near-field communication (NFC), ZigBee® and the like that allows communication between two electronic devices, i.e., the mobile device 120 and the authenticator 112.

In step 530, if the application 340 can detect the authenticator 112 by Bluetooth, the process continues to step 550 where the GPS function of the mobile device 120 is turned to a state of off. In step 530, if the application cannot detect the authenticator 112 by Bluetooth®, the process continues to step 540 where the application 340 determines if the authenticator 112 can be detected by the GPS function. For example, the application 340 can include coordinates of one or more authenticators 112, and if the mobile device 120 is within a defined distance of authenticator 112, the process continues to step 550 where the GPS function of the mobile device is turned to a state of off. If the application 340 cannot detect the reader by the GPS function of the mobile device 120, the process continues to step 544 where the GPS function of the mobile device 120 remains in the on state and returns to step 520.

As shown in FIG. 5B, in step 560, the application 340 checks if the wireless communication can be completed with the authenticator 112, for example, via a Bluetooth communication protocol. In step 570, the application makes a determination if the communication with the authenticator 112 has been completed. If the communication has been completed in step 570, the process continues to step 580 wherein the GPS function of the mobile device 120 is turned to a state of on. In accordance with an exemplary embodiment, the GPS function of the mobile device 120 is turned to a state of on so that the mobile device 120 can detect another authenticator 112 as needed. Alternatively, if the communication cannot be completed in step 570, the process returns to step 560 in which the application checks for completion of the communication with the authenticator 112. In accordance with an exemplary embodiment, the process can return, for example, to step 510, at a predefined intervals. For example, the predefined intervals can be set by the user 130 via the application 340, for example, to 1 minute to an hour, for example, preferably 5 minutes to 15 minutes, in which the process as disclosed in FIGS. 5A and 5B is repeated. The process ends in step 590.

Figure 6:
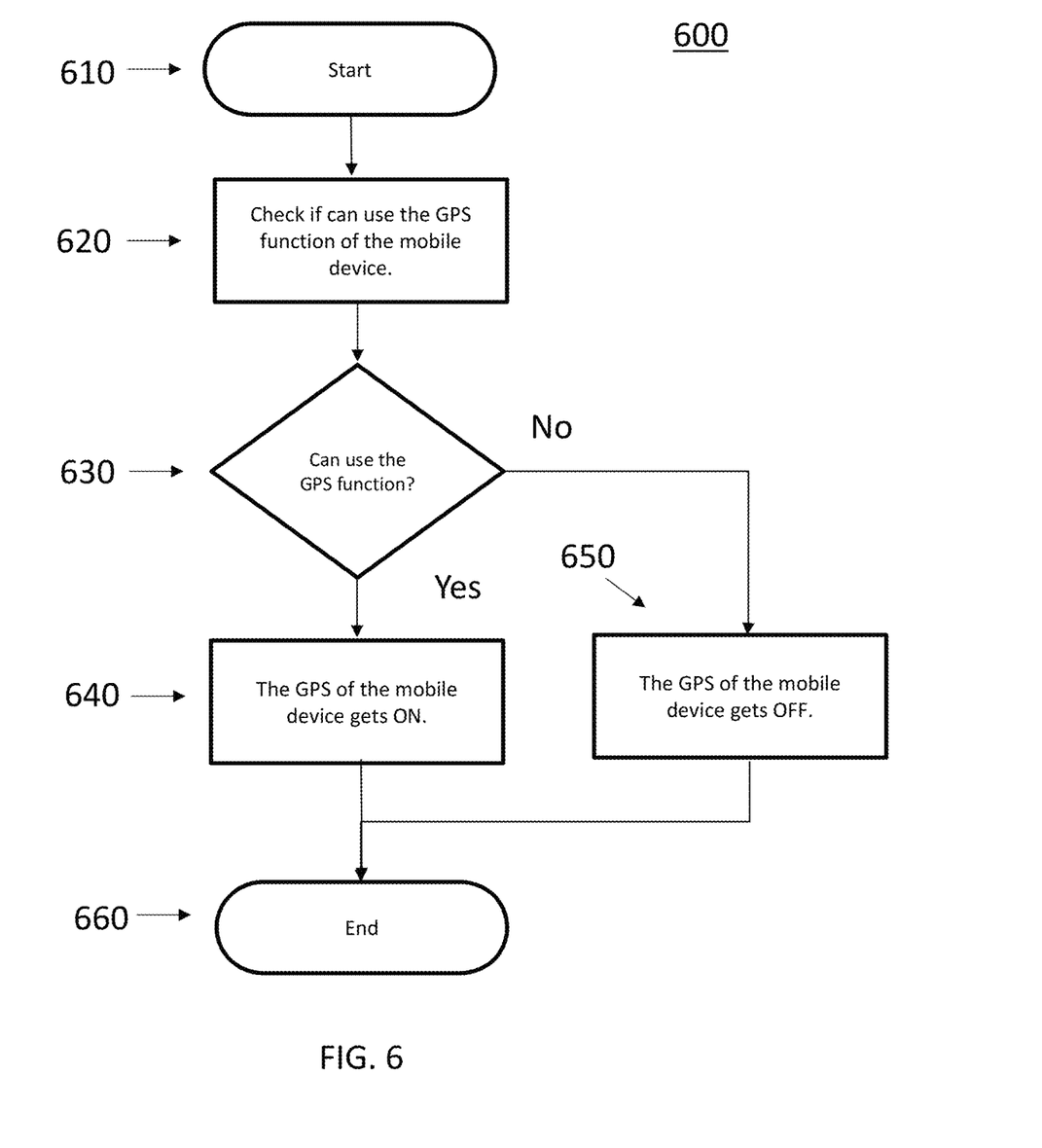
FIG. 6 is a flow chart illustrating an embodiment of a method and system for controlling communication means for determining authentication area to reduce battery consumption of mobile devices.

FIG. 6 is a flow chart 600 illustrating an embodiment of a method and system for controlling communication means for determining authentication area to reduce battery consumption of mobile devices. As shown in FIG. 6, the process starts in step 610 in which the location setting on the mobile device 120 is enabled (i.e., in an on state). In step 620, the application 340 on the mobile device 120 determines if the mobile device 120 can use the GPS function based on a location of the mobile device 120. For example, in some environments, for example, when a user 130, for example, is underground in a tunnel or in a parking garage, the GPS function on the mobile device 120 may not work. In step 630, when the application 340 on the mobile device 120 cannot use the GPS function, the process continues to step 650 where the GPS function is turned to a state of off. If the GPS function (i.e., locating setting) of the mobile device 120 can be used, the process continues to step 640, where the GPS function is either turned on, or alternatively, remains in the on state. In accordance with an exemplary embodiment, the process can return, for example, to step 610, at a predefined intervals. For example, the predefined intervals can be set by the user 130 via the application 340, for example, to 1 minute to an hour, for example, preferably 5 minutes to 15 minutes, in which the process as disclosed in FIG. 6 is repeated. The process ends in step 660.

Figure 7:
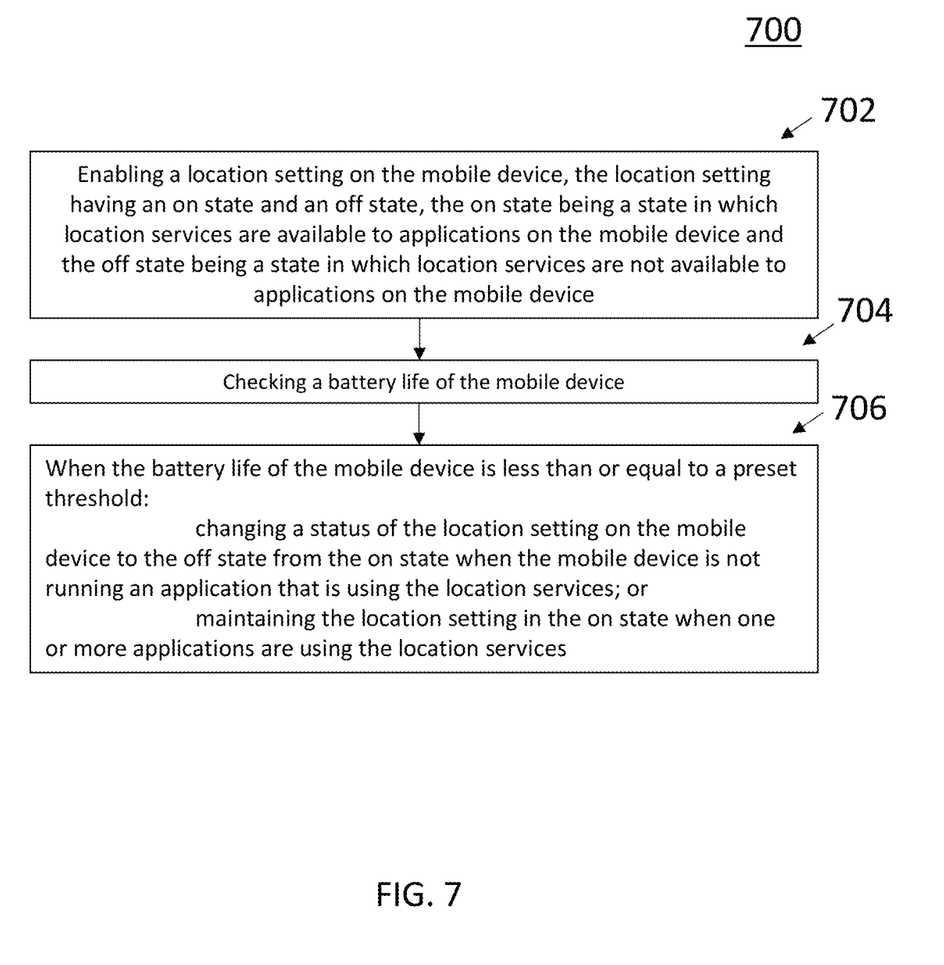
FIG. 7 is a flow chart illustrating an embodiment of a method for controlling communication means for determining authentication area to reduce battery consumption of mobile devices.

FIG. 7 is a flow chart 700 illustrating an embodiment of a method for reducing battery consumption of mobiles devices with location settings. As shown in FIG. 1, in step 702, a location setting is enabled on the mobile device. The location setting having an on state and an off state, the on state being a state in which location services are available to applications on the mobile device and the off state being a state in which location services are not available to applications on the mobile device. In step 704, a battery life of the mobile device is checked. In step 706, when the battery life of the mobile device is less than or equal to a preset threshold, the method includes changing a status of the location setting on the mobile device to the off state from the on state when the mobile device is not running an application that is using the location services, or maintaining the location setting in the on state when one or more applications are using the location services.

In accordance with another embodiment, when the battery life of the mobile device is greater that than the preset, the method includes maintaining the location setting in the on state.

In accordance with an embodiment, the mobile device has an authentication application that utilizes a wireless communication protocol, and the method further includes when the authentication application detects an authenticator with the wireless communication protocol, changing the location setting to the off state. Alternatively, when the authentication application cannot detect the authenticator with the wireless communication protocol and the authentication application cannot detect the authenticator with the location services, changing the location to the on state or keeping the location services in the on state. In addition, when the authentication application cannot detect the authenticator with the wireless communication protocol and the authentication application can detect the authenticator with the location services, changing the location services to the off state. In accordance with an embodiment, when the authentication application cannot detect the authenticator with the wireless protocol and the authentication application cannot detect the authenticator with the location services, and wherein the location setting has been changed to the on state or the location setting has remained in the on state, the method includes continuously checking if the authenticator can be detected by the wireless communication protocol until the authenticator can be detected by the wireless communication protocol.

In accordance with an exemplary embodiment, when the authentication application can detect the authenticator with the wireless communication protocol, changing the location setting to the off state, checking if the authentication application completes the wireless communication protocol with the authenticator to authenticate the mobile device, and changing the state of the location services to the on state once the communication between the wireless communication protocol and the authenticator has been completed and the mobile device has been authenticated.

In accordance with an exemplary embodiment, the state of the location services can be changed to the off state when the location services are not available based on a location of the mobile device.

In accordance with an exemplary embodiment, the location services on the mobile device can utilize a global satellite positioning (GPS) system, and the wireless communication protocol on the mobile device can be Bluetooth, near field communication (NFC), or ZigBee.

Figure 8:
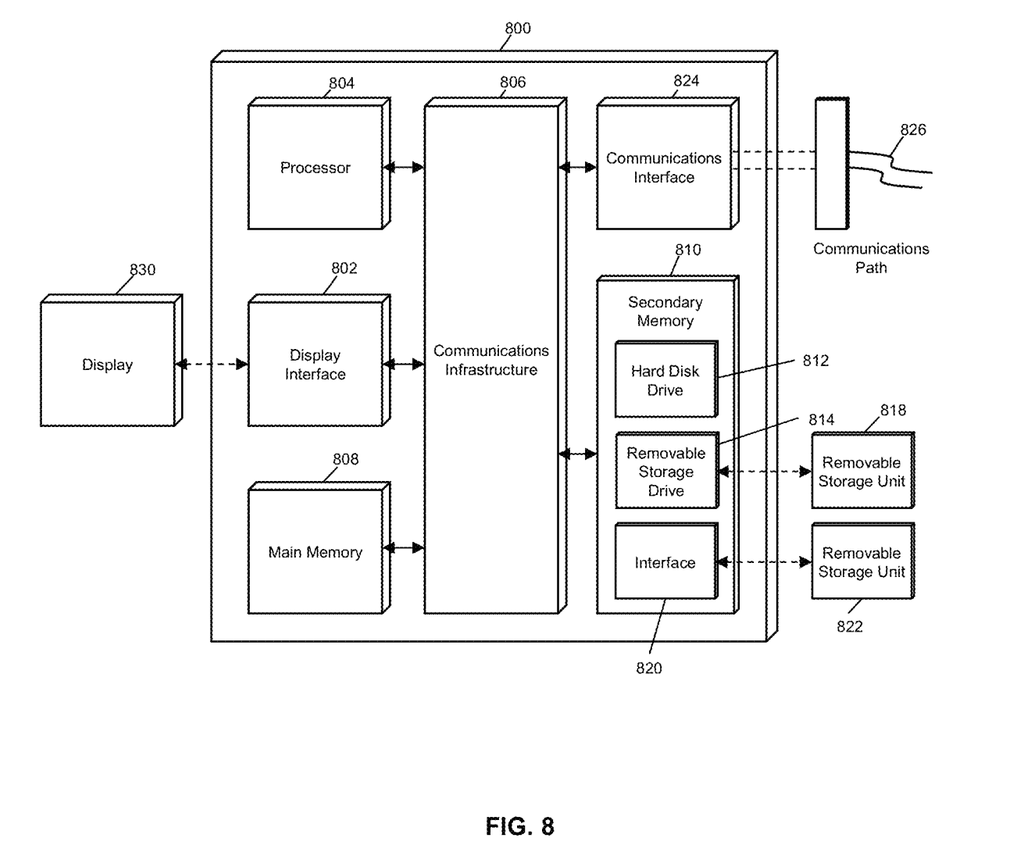
FIG. 8 is an exemplary hardware architecture for an embodiment of a communication device.

FIG. 8 illustrates a representative computer system 800 in which embodiments of the present disclosure, or portions thereof, may be implemented as computer-readable code executed on hardware. For example, the authenticator 112 and/or the authentication server 116 may be implemented in whole or in part by a computer system 800 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this representative computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 804 may be processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 1-7, as discussed herein. Accordingly, such computer programs may represent controllers of the computer system 800. Where the present disclosure is implemented using software executed on hardware, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software executed on hardware, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, methods and systems for controlling communication means for determining authentication area to reduce battery consumption of mobile devices. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for reducing battery consumption of mobiles devices with location settings, the method comprising:
providing a location of a mobile device, the mobile device including a location setting and an authentication application, the authentication application configured to communicate with an authenticator that grants a user of the mobile device access by detection of the mobile device using the location setting of the mobile device, the location setting having an on state and an off state, the on state being a state in which location services are available to applications on the mobile device and the off state being a state in which location services are not available to applications on the mobile device;
checking a battery life of the mobile device; and
when the battery life of the mobile device is less than or equal to a preset threshold:

changing a status of the location setting on the mobile device to the off state from the on state when the mobile device is not running an application that is using the location services; or maintaining the location setting in the on state when one or more applications are using the location services.

2. The method according to claim 1, wherein when the battery life of the mobile device is greater than the preset threshold, the method comprising:
maintaining the location setting in the on state.

3. The method according to claim 1, wherein the authentication application includes a wireless communication protocol, the method further comprising:
when the authentication application detects the authenticator with the wireless communication protocol, changing the location setting to the off state;
when the authentication application cannot detect the authenticator with the wireless communication protocol and the authentication application cannot detect the authenticator with the location services, changing the location to the on state or keeping the location services in the on state; and
when the authentication application cannot detect the authenticator with the wireless communication protocol and the authentication application can detect the authenticator with the location services, changing the location services to the off state.

4. The method according to claim 3, wherein the authentication application cannot detect the authenticator with the wireless protocol and the authentication application cannot detect the authenticator with the location services, and wherein the location setting has been changed to the on state or the location setting has remained in the on state, the method further comprising:
continuously checking if the authenticator can be detected by the wireless communication protocol until the authenticator can be detected by the wireless communication protocol.

5. The method according to claim 3, wherein when the authentication application can detect the authenticator with the wireless communication protocol, changing the location setting to the off state, the method further comprising:
checking if the authentication application completes the wireless communication protocol with the authenticator to authenticate the mobile device; and
changing the state of the location services to the on state once the communication between the wireless communication protocol and the authenticator has been completed and the mobile device has been authenticated.

6. The method according to claim 3, wherein the location services utilize a global satellite positioning (GPS) system, and the wireless communication protocol is Bluetooth, near field communication (NFC), or ZigBee.

7. The method according to claim 1, further comprising:
changing the state of the location services to the off state when the location services are not available based on the location of the mobile device.

8. The method according to claim 1, further comprising:
granting the user of the mobile device access via the authenticator by bringing the mobile device into contact with the authenticator or within a defined range or distance of the authenticator.

9. The method according to claim 1, further comprising:
locking or unlocking an access door based on the detection of the mobile device using the location setting of the mobile device by the authenticator.

10. A non-transitory computer readable medium storing computer readable program code executed by a processor for reducing battery consumption of mobiles devices with location settings, the process comprising:
providing a location of a mobile device, the mobile device including a location setting and an authentication application, the authentication application configured to communicate with an authenticator that grants a user of the mobile device access by detection of the mobile device using the location setting of the mobile device, the location setting having an on state and an off state, the on state being a state in which location services are available to applications on the mobile device and the off state being a state in which location services are not available to applications on the mobile device;
checking a battery life of the mobile device; and
when the battery life of the mobile device is less than or equal to a preset threshold:
changing a status of the location setting on the mobile device to the off state from the on state when the mobile device is not running an application that is using the location services; or
maintaining the location setting in the on state when one or more applications are using the location services.

11. The non-transitory computer readable medium according to claim 10, wherein when the battery life of the mobile device is greater than the preset threshold, the process comprising::
maintaining the location setting in the on state.

12. The non-transitory computer readable medium according to claim 10, wherein the authentication application includes a wireless communication protocol, the process further comprising:
when the authentication application detects the authenticator with the wireless communication protocol, changing the location setting to the off state;
when the authentication application cannot detect the authenticator with the wireless communication protocol and the authentication application cannot detect the authenticator with the location services, changing the location services to the on state or keeping the location services in the on state; and
when the authentication application cannot detect the authenticator with the wireless communication protocol and the authentication application can detect the authenticator with the location services, changing the location services to the off state.

13. The non-transitory computer readable medium according to claim 12, wherein the authentication application cannot detect the authenticator with the wireless protocol and the authentication application cannot detect the authenticator with the location services, and wherein the location setting has been changed to the on state or the location setting has remained in the on state, the process further comprising:
continuously checking if the authenticator can be detected by the wireless communication protocol until the authenticator can be detected by the wireless communication protocol.

14. The non-transitory computer readable medium according to claim 12, wherein when the authentication application can detect the authenticator with the wireless communication protocol, changing the location setting to the off state, the process further comprising:

checking if the authentication application completes the wireless communication protocol with the authenticator to authenticate the mobile device; and changing the state of the location services to the on state once the communication between the wireless communication protocol and the authenticator has been completed and the mobile device has been authenticated.

15. The non-transitory computer readable medium according to claim 12, wherein the location services utilize a global satellite positioning (GPS) system, and the wireless communication protocol is Bluetooth, near field communication (NFC), or ZigBee.

16. The non-transitory computer readable medium according to claim 10, further comprising:

changing the state of the location services to the off state when the location services are not available based on the location of the mobile device.

17. A mobile device having a battery consumption application, the mobile device comprising:

a memory; and a processor configured to:

provide a location of a mobile device, the mobile device including a location setting and an authentication application, the authentication application configured to communicate with an authenticator that grants a user of the mobile device access by detection of the mobile device using the location setting of the mobile device, the location setting having an on state and an off state, the on state being a state in which location services are available to applications on the mobile device and the off state being a state in which location services are not available to applications on the mobile device;

check a battery life of the mobile device; and when the battery life of the mobile device is less than or equal to a preset threshold:

change a status of the location setting on the mobile device to the off state from the on state when the mobile device is not running an application that is using the location services; or maintain the location setting in the on state when one or more applications are using the location services.

18. The mobile device according to claim 17, when the battery life of the mobile device is greater than the preset threshold, the processor is configured to:

maintain the location setting in the on state.

19. The mobile device according to claim 17, wherein the mobile device has an authentication application that utilizes a wireless communication protocol, the processor configured to:

when the authentication application detects an authenticator with the wireless communication protocol, change the location setting to the off state;

when the authentication application cannot detect the authenticator with the wireless communication protocol and the authentication application cannot detect the authenticator with the location services, change the location services to the on state or keep the location services in the on state; and when the authentication application cannot detect the authenticator with the wireless communication protocol and the authentication application can detect the authenticator with the location services, change the location services to the off state.

20. The mobile device according to claim 17, wherein when the authentication application cannot detect the authenticator with the wireless protocol and the authentication application cannot detect the authenticator with the location services, and wherein the location setting has been changed to the on state or the location setting has remained in the on state, the processor configured to:

continuously check if the authenticator can be detected by the wireless communication protocol until the authenticator can be detected by the wireless communication protocol; and wherein when the authentication application can detect the authenticator with the wireless communication protocol, changing the location setting to the off state, the processor configured to:

check if the authentication application completes the wireless communication protocol with the authenticator to authenticate the mobile device; and change the state of the location services to the on state once the communication between the wireless communication protocol and the authenticator has been completed and the mobile device has been authenticated.

* * * * *